J. D. KING.
SAFETY ATTACHMENT FOR RAILWAY CARS.
APPLICATION FILED JULY 1, 1919.

1,344,232.

Patented June 22, 1920.

WITNESS:
Gustav Genzlinger.

INVENTOR.
James D. King
BY Cyrus N. Anderson
ATTORNEY.

UNITED STATES PATENT OFFICE.

JAMES D. KING, OF MERIDIAN, MISSISSIPPI.

SAFETY ATTACHMENT FOR RAILWAY-CARS.

1,344,232.           Specification of Letters Patent.     Patented June 22, 1920.

Application filed July 1, 1919. Serial No. 307,954.

*To all whom it may concern:*

Be it known that I, JAMES D. KING, a citizen of the United States, and a resident of Meridian, in the county of Lauderdale and State of Mississippi, have invented an Improvement in Safety Attachments for Railway-Cars, of which the following is a specification.

My invention relates to safety attachments for railway cars which are adapted to become operative only in case of abnormal or unduly great relative lateral movement between the truck frame and the car body structure of a car.

One object of my invention is to provide an improved construction of means for releasing a valve by which the operation of the air brake system is controlled.

Another object of my invention is to simplify the construction of devices of this character and at the same time render them more efficient and less likely to fail to operate at the critical moment, as in the case of the derailment of a truck or other accident whereby abnormal or unduly great relative lateral movement between the truck and the car body structure is effected.

Other objects and advantages of my invention will be referred to and pointed out in the detailed description which follows or will be apparent from such description.

In order that my invention may be readily understood and its practical advantages fully appreciated, reference may be had to the accompanying drawing in which I have illustrated one form of a convenient embodiment thereof. It will be understood, however, that modifications of the structure may be made within the scope of the claims without departing from my invention.

Figure 1:
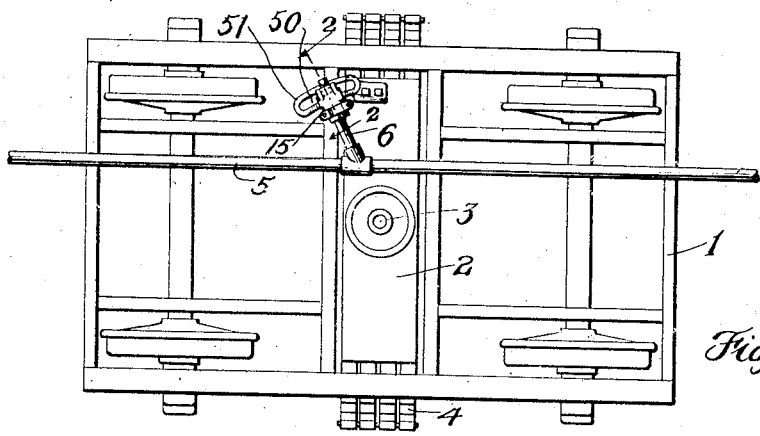
Figure 1 is a top plan view of a car truck frame, a section of an air line pipe and of the attachment embodying my invention associated therewith.
Figures 2, 3:
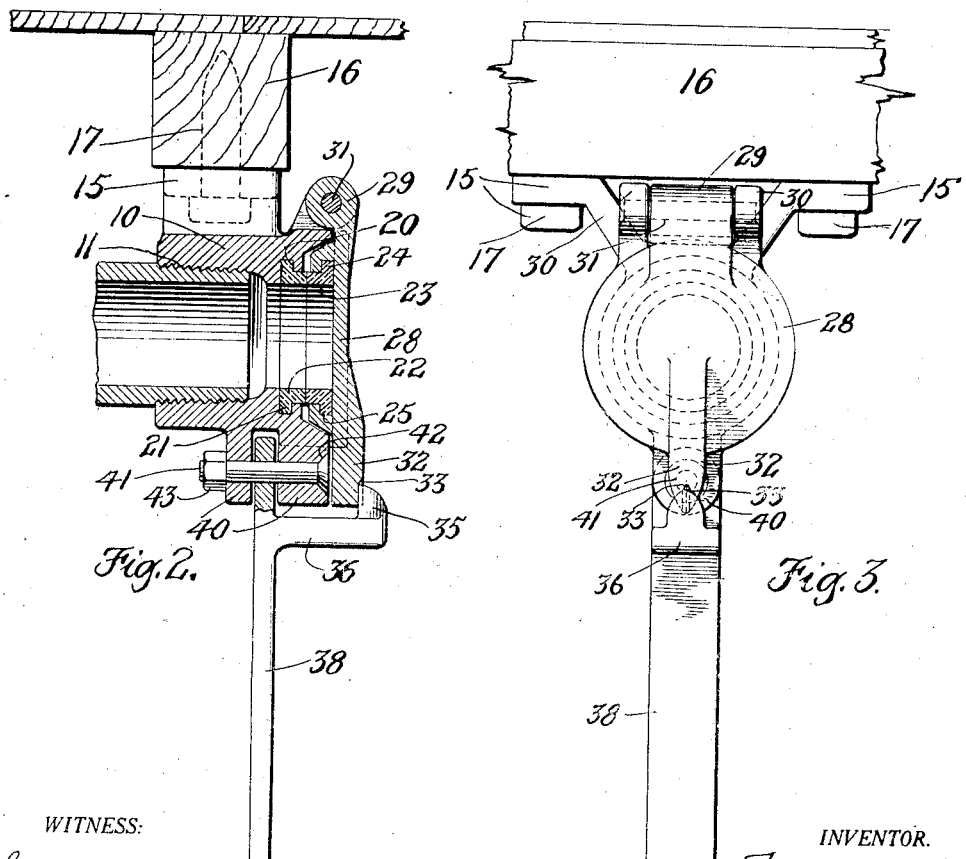
Fig. 2 is a vertical sectional view through a portion of the bottom of the body of the car, and an underlying sill and of the attachment taken on the line 2—2 of Fig. 1.
Fig. 3 is an end elevation of the attachment embodying my invention and showing in side elevation a portion of the sill to which a part of the said attachment is secured.

Referring to the drawing: 1 designates as a whole the car truck frame structure having a truck bolster 2 with an opening 3 at its center for the king pin by means of which the car body structure and the truck bolster are pivotally connected. The truck bolster 2 is supported in known manner upon plate springs, the outer ends 4 only of which are shown.

5 designates a section of the air line pipe from which extends a bleed pipe 6, provided at its outer end with a head or terminal 10 having screw threaded connection therewith, as indicated at 11, whereby the pipe 6 and head 10 may be disconnected from each other if desired.

The head or terminal 10 is provided with projecting lugs or brackets 15 which are adapted to be secured to the under side of the sill 16 or any other relatively stationary part of the car body structure, as may be preferred, by means of a screw or bolt 17.

The head or terminal member 10 is provided with an undercut annular groove 20 for the reception of an annular flange 21 of a gasket 22 which is adapted to contact and coöperate with a gasket 23 having an annular flange 24 which is fitted into an undercut groove 25 formed in a pivoted valve member 28. The upper edge portion of the valve member is provided with a relatively wide perforated lug 29 which is adapted to fit in between a couple of spaced lugs 30 projecting upwardly from the upper, outer edge of the head or terminal member 10. These lugs are also perforated so that a pivot 31 may pass through the said lugs and through the opening in the projecting lug 29 to pivotally connect the valve member 28 to the head or terminal member 10.

At its lower edge, or rather at a point substantially diametrically opposed to the lug 29, the pivoted valve member 28 is provided with a projection 32 having a notch 33 in the outer surface thereof. The end portion of the projection 32 is tapered as indicated and its outer surfaces on opposite sides of the notch 33 are beveled or inclined so as to facilitate the engagement of the edge of the wedge shaped projection 35 therewith. The said projection 35 is formed upon the outer end of a projection 36 which extends forwardly or outwardly from the arm 38 which is pivotally secured between the lugs 40 which project or extend laterally from the head or terminal 10, said lugs being spaced from each other as shown. The upper end of the arm 38 extends into the space between the said lugs and is retained in such position by means of a pivot bolt 41 the head of which is seated in the countersink 42 formed in the outer side of the outer one of the lugs 40. The said countersink is situated underneath the projection 32 so that said projection may operate to retain the pivot bolt 41 in position in case the nut 43 should become loose or accidentally removed. It will be noted that the arm 38 is pivoted eccentrically with respect to the axis of the opening through the head or terminal 10.

It will be understood that when the projection 35 is forced into engagement with the notch 33 in the projection 32, the valve member 28 is forced inwardly toward the outer end of the head or terminal 10 and the bleed pipe 6, causing a compression of the contacting edges of the gaskets 22 and 23. As a result of such compression the said gaskets tend to force the said pivoted valve member outwardly, with the result that the projection 32 is held firmly bound against the knife like edge of the projection 35 which is seated in the notch 33. In this way the valve 28 is held firmly in closed position and cannot be opened except sufficient force be applied to the arm 38, to effect pivotal movement thereof to disengage the projection 35 from the notch 33.

Normally the arm 38 depends downwardly into or through a curved slot 50 which is provided in a bracket 51 preferably supported upon the truck bolster 2, although it may be supported upon any other part of the truck frame structure. The said slot is concentric with the opening 3 for the king pin in the truck bolster and is of a length such that its opposite ends will contact with the said arm 38 only in case there should be abnormal or unduly great relative lateral movement between the truck frame structure and the car body structure; that is, only when the bracket 51 moves through an abnormal or unduly great distance laterally with respect to the arm 38. This may occur in case of the derailment of the truck or as a result of some other accident.

It will be seen that I have provided an attachment of very simple construction which must operate if the bracket 51 moves through a sufficient distance to actuate the arm 38 because if the said arm be turned in either direction it must disengage the projection 35 from the projection 32, because any force applied to the arm 38 sufficient to cause disengagement of the said projections cannot possibly effect rotation of the head or terminal member 10 which is fixedly secured to the sill 16 or some other part of the car body structure. Upon disengagement of the projections 35 and 32, the air pressure from the air line pipe in the bleed pipe 6 against the inner side of the valve member 28 causes it to fly open and release the air within the air line pipe, with the result that the brakes are applied.

Preferably the head or terminal 10 is so positioned with respect to the slot 50 that the axis thereof extends at a right angle to lines tangent to the said slot.

Normally the valve 28 is in closed position as shown in the drawing, and it remains in that position until it is opened by some one for some purpose, or until it is disengaged from its seat, as the result of a derailment of a truck. In the latter event, the truck moves laterally relatively to the body of the car, and generally around the king pin as a pivot. Such movement causes one end or the other of the slot 50 in the bracket 51 carried upon the truck bolster 2, to contact with the arm 38 to turn the latter in one direction or the other, which releases the valve 28 and permits the opening of the same under the influence of the air pressure within the pipes 5 and 6. The valve being thus opened to release the air under compression from the pipes 5 and 6, the brakes are as a result applied.

I claim:

1. In a safety attachment for railway cars, the combination of the air line pipe of an air brake system having a bleed pipe projecting therefrom, a valve member pivotally supported at the outer end of said bleed pipe for closing the same, said valve member having a projection from its edge, spaced lugs projecting laterally from the bleed pipe structure, and an arm pivotally secured between said lugs and depending therefrom, said arm having a projection adjacent its pivot having a part adapted to engage the projection from the said valve member, substantially as described.

2. In a safety attachment for railway cars, the combination of the air line pipe of an air brake system, a bleed pipe extending therefrom and having at its outer end a head or terminal portion, said head or terminal portion being provided with two pairs of lugs oppositely disposed with respect to each other, a valve member pivotally connected to one of said pairs of lugs and adapted to close the outer end of said bleed pipe, said valve member having a projection which extends adjacent and in parallel relation to the other pair of said lugs, an arm having one end situated between the said other pair of lugs, a pivot bolt extending through said last mentioned lugs and the said arm to pivotally connect the said arm to said lugs, and the said arm being provided with an outwardly extending projection having a portion adapted to engage the projection upon said valve member to hold the latter in closed position.

3. In a safety attachment for railway cars, the combination of the air line pipe of an air brake system having a bleed pipe extending laterally therefrom, and provided at its outer end with a head or terminal part, said head or terminal part having a bracket, means for securing said bracket to a part of the car body structure and the said head or terminal part being provided with two pairs of lugs at its outer end, situated in oppositely disposed relation with respect to each other, the lugs of each pair being spaced from each other, a valve member having pivotal connection with one of said pairs of lugs and having a notched projection oppositely disposed with respect to its point of pivotal connection to said lugs, said projection extending adjacent and in parallel relation to the other pair of said lugs, an arm having one end projected into the space between the last mentioned pair of lugs, a pivot bolt extending through said lugs and said arm to pivotally support the latter, the head of said bolt being situated underneath the projection from the said pivoted valve member, and the said arm being provided with a projection having a part adapted to engage the notch in the projection from said valve member for holding the latter in closed position.

4. In a safety attachment for railway cars, the combination of the air line pipe of an air brake mechanism having a bleed pipe projecting therefrom and having a head or terminal member at its outer end, said head or terminal member having two pairs of spaced laterally extended perforated lugs at its outer end, one pair of said lugs being situated at the top and the other at the bottom side of said head or terminal, a valve member having a perforated projection situated intermediate the top pair of lugs, a pivot extending through the said lugs and the said projection, and the said valve member being provided with a projection at its lower edge which extends adjacent and in parallel relation to the outer side of the outermost of the bottom pair of lugs, an arm having a perforated end portion which projects into the space between the bottom lugs, a pivot extending through the perforations through said lugs and said arm, the outer end of said pivot being situated underneath the projection from said valve member, and the said arm being provided with an outwardly extending projection having a part which is adapted to engage the projection from said valve member to hold the latter in closed position.

5. In a safety attachment for railway cars, the combination of the air line pipe of an air brake system having a bleed pipe extending laterally therefrom, a head or terminal member having detachable connection with the outer end of said bleed pipe, said head or terminal member having an opening in continuation of the opening through said pipe, said head or terminal member being provided with two pairs of perforated lugs, one pair being situated at the top side thereof and the other at the bottom side thereof, means for normally preventing relative movement between the said head or terminal part and the said bleed pipe, a valve member pivotally supported upon the lugs at the top side of the said head or terminal part for closing the opening through the said head or terminal part, said valve member having a projection extending in the plane thereof and in oppositely disposed relation to its point or pivotal support, an arm having pivotal connection with the lugs at the lower side of said head or terminal part, said arm being provided with a forwardly extending projection having a part adapted to engage the projection from the said valve member, a car truck structure, a bracket secured thereto and having a slot therein into which the lower end of said arm projects, substantially as described.

6. In a safety attachment for railway cars, the combination of the air line pipe of an air brake system, a bleed pipe extending laterally from said line pipe, a valve member pivotally connected to one side of the outer end of said bleed pipe and extending across the open end thereof, an arm pivotally connected to the opposite side of said outer end and in rear of the swinging end of said valve member, said arm having an outwardly extending projection which terminates in an inward extension which is adapted to engage said valve member to hold it in closed position.

7. In a safety attachment for railway cars, the combination of the air line pipe of an air brake system, a bleed pipe extending laterally from said line pipe, a valve member pivotally connected to one side of the outer end of said bleed pipe and extending across the open end thereof, an arm pivotally connected to the opposite side of said outer end and extending in a direction parallel to the said valve member, said arm having a lateral projection provided with means for detachably engaging the said valve member to hold the same in closed position.

8. In a safety attachment for railway cars, the combination of the air line pipe of an air brake system, a bleed pipe extending laterally from said air line pipe, said bleed pipe being provided with a laterally projecting lug situated adjacent its outer end, a valve member pivotally connected to one side of the outer end of said bleed pipe at a point opposite the said lug, and said valve extending across the open end of said bleed pipe and overlapping said lug, and an arm pivotally connected to the said lug, a pivot for connecting said arm to said lug, said pivot being adapted to be retained in position by the overlapping portion of the said valve member, and the said arm being provided with means for engaging the said valve member to hold the same in closed position.

9. In a safety attachment for railway cars, the combination of the air line pipe of an air brake system, a bleed pipe extending laterally from said air line pipe, a valve member pivotally connected to one side of the outer end of said bleed pipe and extending across the open end thereof, an arm pivoted adjacent the outer end of said bleed pipe eccentrically of the open end thereof and in adjacent relation to the swinging end of said pivoted valve member, and the said arm extending beyond and in a plane parallel to the said valve member when the latter is in closed position, and the said arm having a laterally extending projection which is adapted to detachably engage the said valve member to hold it in closed position.

In testimony that I claim the foregoing as my invention, I have hereunto set my hand this 26th day of June, A. D. 1919.

JAMES D. KING.